United States Patent
Kemp et al.

(10) Patent No.: US 7,058,488 B2
(45) Date of Patent: Jun. 6, 2006

(54) VEHICLE TESTING APPARATUS FOR MEASURING A PROPENSITY OF A VEHICLE TO ROLL OVER

(75) Inventors: Kevin Kemp, Walker, MI (US); Hamid Alper Oral, Grand Rapids, MI (US); Mark Hoenke, Grand Rapids, MI (US)

(73) Assignee: Burke E. Porter Machinery Company, Grand Rapids, MI (US)

( * ) Notice: Subject to any disclaimer, the term of this patent is extended or adjusted under 35 U.S.C. 154(b) by 80 days.

(21) Appl. No.: 10/428,293

(22) Filed: May 2, 2003

(65) Prior Publication Data

US 2004/0003655 A1   Jan. 8, 2004

Related U.S. Application Data

(60) Provisional application No. 60/377,723, filed on May 3, 2002.

(51) Int. Cl.
 *G01M 17/06* (2006.01)
(52) U.S. Cl. .............................. 701/33; 73/669; 73/117; 73/862.043
(58) Field of Classification Search ................ 187/207, 187/216, 213; 73/865.3, 862.043, 862.042, 73/862.041, 862, 670, 669, 117.1, 123, 117.2; 700/150, 67; 901/16; 414/678, 465, 466; 248/583, 581, 651; 434/30, 32, 55, 67; 701/33

See application file for complete search history.

(56) References Cited

U.S. PATENT DOCUMENTS

| 3,837,221 A | | 9/1974 | Odier ........................... 73/124 |
| 4,862,737 A | * | 9/1989 | Langer ......................... 73/117 |
| 4,984,657 A | * | 1/1991 | Burns ........................... 187/207 |
| 4,992,943 A | | 2/1991 | McCracken ............ 364/424.04 |

(Continued)

FOREIGN PATENT DOCUMENTS

JP         02-208536      *    8/1990

(Continued)

OTHER PUBLICATIONS

Publication entitled *"The Advanced Daimler-Benz Driving Simulator"* reprinted from: Vehicle Computer Applications: Vehicle Systems and Driving Simulation (SP-1080); from SAE International; published in Mar. 1995; by Wilfried Käding and Friedrich Hoffmeyer of Daimler-Benz AG.

(Continued)

*Primary Examiner*—Thomas G. Black
*Assistant Examiner*—Christine M. Behncke
(74) *Attorney, Agent, or Firm*—Van Dyke, Gardner, Linn & Burkhart, LLP

(57) ABSTRACT

A vehicle testing apparatus for subjecting a vehicle to a compound force includes a support disposed in a plane for supporting the vehicle, and a mechanism coupled to the support for moving the support along at least one of three perpendicular axes. The mechanism subjects the vehicle to the compound force resulting from simultaneous movements along any combination of the axes. The mechanism includes a first platform constrained for rectilinear movement along a first axis, and a second platform constrained for rectilinear movement along a second axis, with the support preferably also being movable along a third axis. The support preferably also includes actively or passively controlled contact surfaces in all three axes with an optional trip mechanism. In addition, a first actuating device is preferably coupled to the first platform and a second actuating device is preferably coupled to the second platform.

22 Claims, 12 Drawing Sheets

U.S. PATENT DOCUMENTS

| | | | |
|---|---|---|---|
| 5,048,342 A | 9/1991 | Morelli | 73/669 |
| 5,111,685 A | 5/1992 | Langer | 73/117 |
| 5,177,998 A | 1/1993 | Monk | 73/65 |
| 5,189,920 A * | 3/1993 | Martinez | 73/865.3 |
| 5,338,206 A | 8/1994 | Hupfer | 434/305 |
| 5,368,484 A | 11/1994 | Copperman et al. | 434/69 |
| 5,375,460 A | 12/1994 | La Belle | 73/117 |
| 5,445,282 A * | 8/1995 | Erikkila | 212/312 |
| 5,610,330 A * | 3/1997 | Fricke et al. | 73/146 |
| 5,612,603 A * | 3/1997 | Kim | 318/568.11 |
| 5,657,227 A | 8/1997 | Freitag | 364/424.034 |
| 5,657,228 A | 8/1997 | Lee | 364/424.034 |
| 5,761,626 A | 6/1998 | Tascillo et al. | 701/29 |
| 6,079,258 A | 6/2000 | List et al. | 73/117.3 |
| 6,138,066 A | 10/2000 | Guo et al. | 701/38 |
| 6,192,745 B1 | 2/2001 | Tang et al. | 73/146 |
| 6,247,357 B1 | 6/2001 | Clayton, Jr. | 73/117 |
| 6,256,601 B1 | 7/2001 | Wipasuramonton et al. | 703/8 |
| 6,327,526 B1 * | 12/2001 | Hagan | 701/33 |
| 6,360,145 B1 | 3/2002 | Robinson | 701/35 |
| 6,445,960 B1 * | 9/2002 | Borta | 700/28 |
| 6,529,811 B1 | 3/2003 | Watson | 701/45 |
| 6,654,671 B1 | 11/2003 | Schubert | |
| 6,714,848 B1 | 3/2004 | Schubert et al. | |
| 6,738,691 B1 * | 5/2004 | Colgate et al. | 700/245 |
| 2002/0065591 A1 | 5/2002 | Schubert et al. | |
| 2003/0088349 A1 | 5/2003 | Schubert et al. | |
| 2003/0158633 A1 | 8/2003 | Schubert | |
| 2003/0230137 A1 | 12/2003 | Kemp et al. | |
| 2004/0010383 A1 | 1/2004 | Lu et al. | |
| 2004/0030473 A1 | 2/2004 | Lu et al. | |
| 2004/0030475 A1 | 2/2004 | Lu et al. | |
| 2004/0064236 A1 | 4/2004 | Lu et al. | |
| 2004/0064246 A1 | 4/2004 | Lu et al. | |
| 2004/0117085 A1 | 6/2004 | Lu et al. | |
| 2004/0133338 A1 | 7/2004 | Verhagen et al. | |
| 2004/0162654 A1 | 8/2004 | Lu et al. | |

FOREIGN PATENT DOCUMENTS

| | | | |
|---|---|---|---|
| JP | 05-093671 | * | 4/1993 |
| WO | WO 03/093781 A2 | | 11/2003 |

OTHER PUBLICATIONS

Publication entitled "*Vehicle Rollover Propensity Measurement Using A Novel Approach*" reprinted from: Vehicle Dynamics & Simulation, 2003 (SP-1778); from SAE *International.;* published in Mar. 2003; by Hamid A. Oral, Kevin Kemp, Mark Hoenke, Yin Wen, Jeffrey Barber, and Ralph Palmer of Burke E. Porter Machinery Company.

Publication entitled "*Military Builds The Roadway Simulator To Speed Vehicle Dynamics, Powertrain, and Durability Testing and Evaluation*" by Gregory Schultz, US Army Aberdeen Test Center and Carl Larsen, MTS Systems Corporation from the magazine *Road Warrior*.

Publication entitled "*Test Method For Simulating Vehicle Rollover*" reprinted from Progress in Safety Methodology (SP-1596); from SAE International; published in Mar. 2001; by Mike Rossey of Autoliv North America.

Co-pending U.S. Appl. No. 10/428,595, entitled "*Method Of Measuring A Propensity Of A Vehicle To Roll Over*", filed on May 2, 2003.

"An Experimental Examination of Selected Maneuvers That May Induce OnRoad, Untripped Light Vehicle Rollover—Phase 1-A of NHTSA's 1997-1998 Vehicle Rollover Research Program," by the U.S. Department of Transportation, National Highway Traffic Safety Administration, DOT HS 809 357, Aug. 2001.

"An Experimental Examination of Selected Maneuvers That May Induce On-Road, Untripped, Light Vehicle Rollover—Phase II of NHTSA's 1997-1998 Vehicle Rollover Research Program," by the U.S. Department of Transportation, National Highway Traffic Safety Administration, DOT HS 808 977, Jul. 1999.

"Measured Vehicle Inertial Parameters—NHTSA's Data Through Nov. 1998," Copyright© 1999 Society of Automotive Engineers, Inc.

"The General Motors Driving Simulator," SAE Technical Paper Series 940179, International Congress & Exposition, Detroit, Michigan, Feb. 28-Mar. 3, 1994.

"Vehicle Stability Control in Limit Cornering by Active Brake," SAE Technical Paper Series 960487, International Congress & Exposition, Detroit, Michigan, Feb. 26-29, 1996.

Erik Dahlberg, "Commercial Vehicle Stability—Focusing on Rollover," Vehicle Dynamics Department of Vehicle Engineering, Royal Institute of Technology, Stockholm, Sweden, 2001.

* cited by examiner

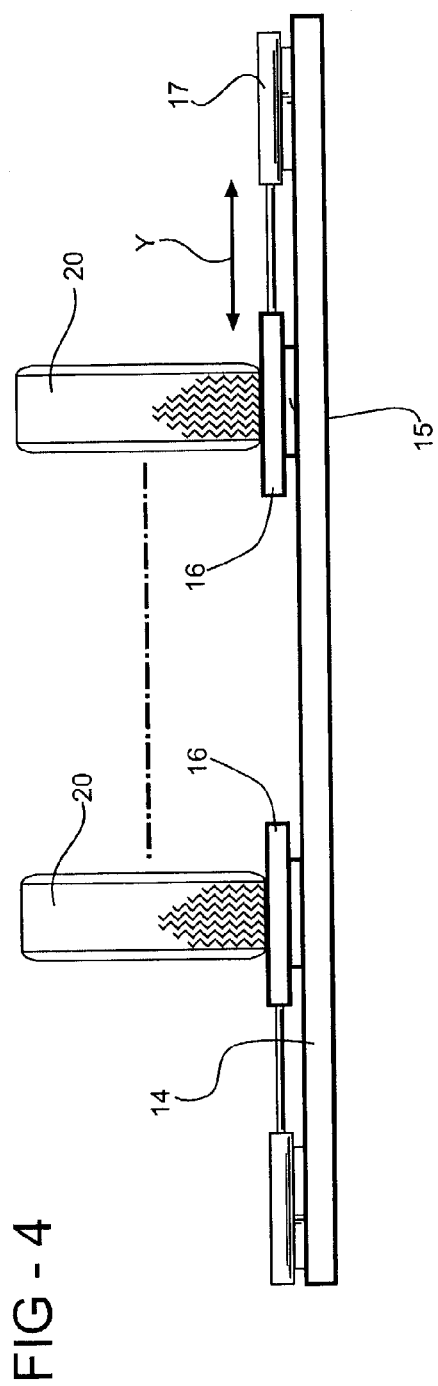
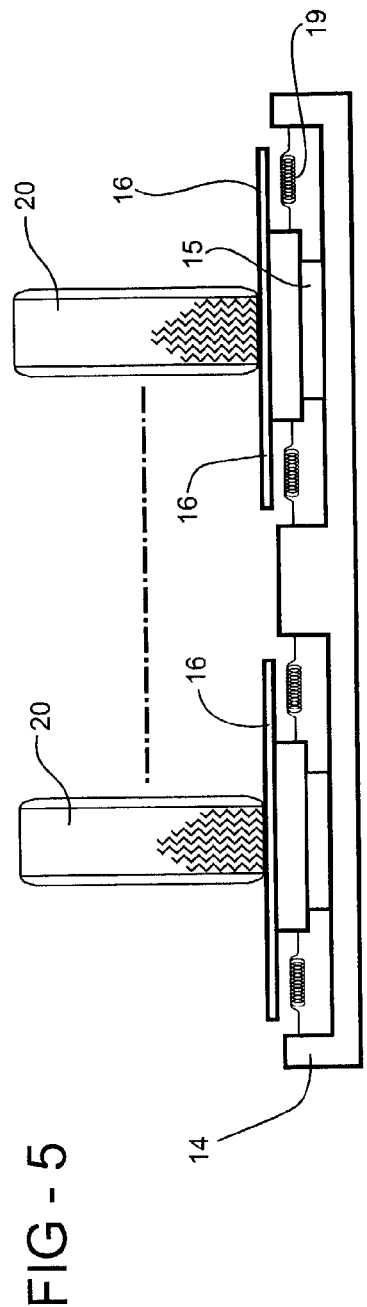

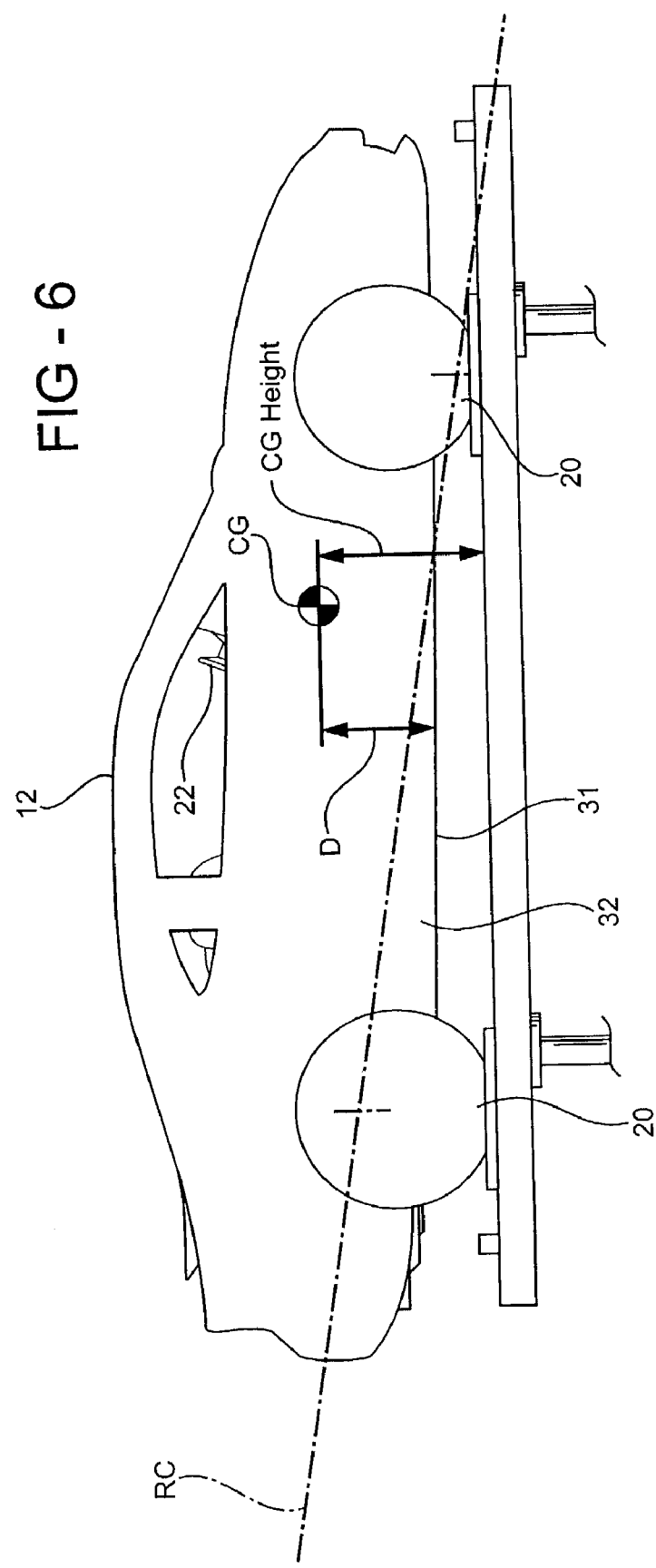

VEHICLE TESTING APPARATUS FOR MEASURING A PROPENSITY OF A VEHICLE TO ROLL OVER

RELATED APPLICATION

The subject application claims priority to and all the benefits of U.S. Provisional patent application Ser. No. 60/377,723, which was filed on May 3, 2002.

BACKGROUND OF THE INVENTION

1. Field of the Invention

The subject invention relates to vehicle testing apparatuses for testing dynamic properties of a vehicle, particularly a propensity of the vehicle to roll over during operation.

2. Description of the Prior Art

Rollover accidents have been one of the greatest vehicle safety concerns for decades, according to the National Highway Traffic Safety Administration (NHTSA). In fact, rollover accidents are the largest cause of fatalities in passenger car and light truck accidents. Rollover accidents have also been the subject of intense litigation over recent years, giving rise to a need for better alternatives to traditional testing of the propensity of vehicles to rollover.

A common standard used by the NHTSA for the propensity of vehicles to rollover is Static Stability Factor, or SSF. As the name implies, the SSF is a static measurement of a vehicle. The SSF is based on one half of the average front and rear track-width divided by the total vehicle center of gravity and height. The SSF is useful as one of many factors in determining the propensity of vehicles to rollover, but alone is insufficient. The SSF assumes that vehicles act like rigid boxes not taking into account the compliance of wheels and suspensions.

Currently, there are several vehicle testing apparatuses that purport to dynamically measure the propensity of vehicles to rollover in a controlled environment. Although such apparatuses may provide useful results for particular properties of vehicles, the apparatuses cannot accurately measure the propensity of vehicles to rollover. The reason for this is that apparatuses of the prior art have limited capability and cannot exert compound dynamic forces on vehicles akin to an actual rollover situation. For example a centrifuge device can be used to produce lateral accelerations. The operation requires that a certain speed to be reached and then the vehicle is released to roll. Hence, any event that is simulated is only what happens after the roll is initiated. Also since a centrifuge device is used, any developed lateral accelerations are not perfectly perpendicular to the vehicle longitudinal axis and varies by the vehicle's length. Another example is a flat track road simulator which can produce roll, pitch and vertical motions of the subject vehicle. However, road simulators lack the lateral acceleration which can be an important factor in a rollover accident. In another example, a vehicle sled allows vehicles to be propelled laterally along a horizontal axis. The vehicle sled is propelled and abruptly stopped to trigger a rollover of the vehicle. The pressure used to propel the sled is not controlled accurately to match the lateral acceleration to any particular rollover maneuver, but rather is aimed to roll the vehicle over following a trip. The vehicle sled cannot exert compound dynamic forces on vehicles akin to an actual rollover situation and thus does not account for many factors that have an effect on the propensity of vehicles to rollover.

Although the propensity of vehicles to rollover can be tested through real-world driving maneuvering on test tracks, such tests have proved to be unrepeatable and unpredictable and therefore cannot be standardized, unless prohibitively expensive methods are used which would be applicable to only a limited number of rollover maneuvers. In addition, a great deal of real-world vehicle rollover situations are tripped by an obstacle, which can either be an object in a roadway or a particular structure of the roadway, such as curbs, potholes, etc. As the vehicle is turning or sliding sideways on the roadway, a side of the wheel encounters the obstacle. The side of the wheel catches on the obstacle, thus creating a fulcrum at the wheel. Vehicle rollover occurs when the moment of lateral forces around a fulcrum overcomes the moment created by the weight of the vehicle about the same fulcrum point. It is almost impossible to formulate a maneuver that will implement a tripped vehicle rollover situation in a repeatable manner on the test track due to uncontrollability and unobservability of several parameters.

Thus, there remains an opportunity for a vehicle testing apparatus for measuring the propensity of vehicles to rollover that produces repeatable results and that provides compound forces in a controlled environment resembling real-world forces exerted on vehicles during tripped and untripped rollover situations.

SUMMARY OF THE INVENTION AND ADVANTAGES

The subject invention provides a vehicle testing apparatus for subjecting a vehicle to a compound force. The apparatus includes a support disposed in a horizontal plane for supporting the vehicle. The apparatus also includes a mechanism coupled to the support for moving the support along three axes. The three axes are perpendicular to one another. The mechanism subjects the vehicle to the compound force that is the result of simultaneous movements along any combination of the axes. The mechanism includes a first member constrained for rectilinear movement along a first axis of the axes. The mechanism also includes a second member constrained for rectilinear movement along a second axis of the axes.

The vehicle testing apparatus of the subject invention produces compound forces on vehicles in a controlled environment similar to real-world forces exerted on vehicles during rollover situations. Furthermore, the vehicle testing apparatus provides test repeatability by applying accurately controlled forces to the vehicle in combination with real world variables, such as the presence of tripping obstacles in a path of the vehicle to induce rollover of the vehicle.

BRIEF DESCRIPTION OF THE DRAWINGS

Other advantages of the present invention will be readily appreciated as the same becomes better understood by reference to the following detailed description when considered in connection with the accompanying drawings wherein:

FIG. 4 is a planar view of an alternative support design of the vehicle testing apparatus;

FIG. 5 is a planar view of another alternative support design of the vehicle testing apparatus;

FIG. 6 is a side view of a vehicle illustrating various points of measurement relevant to a propensity of the vehicle to rollover;

DETAILED DESCRIPTION OF THE INVENTION

Figure 1:
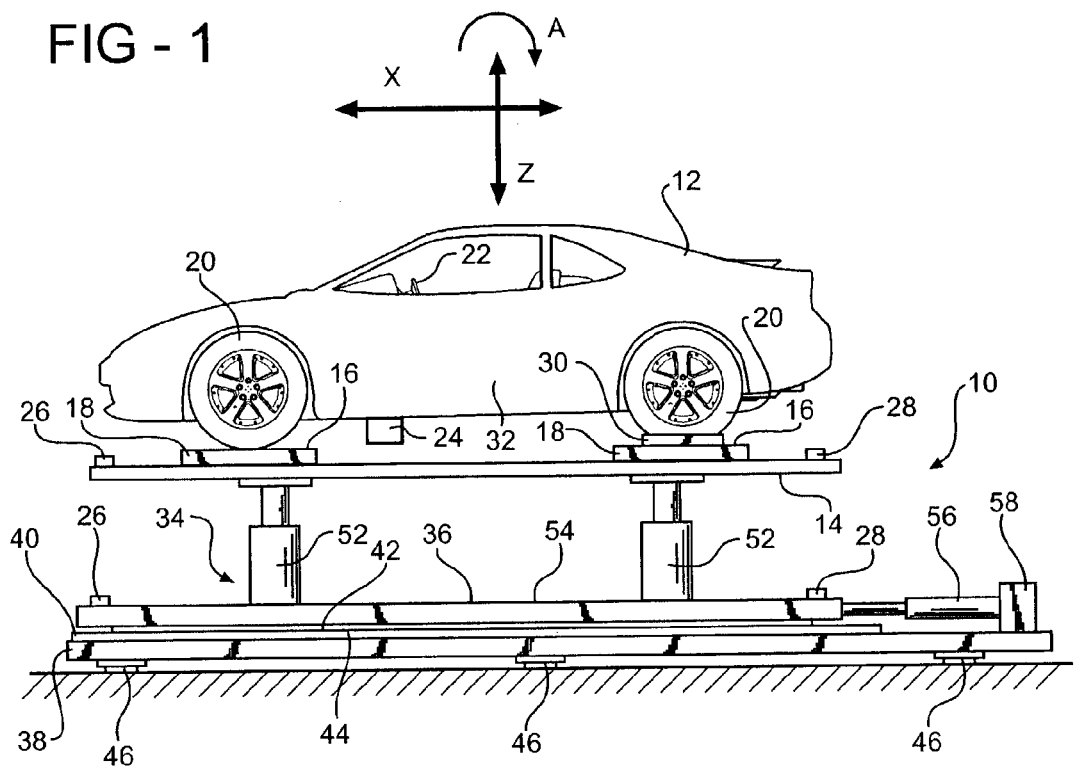
FIG. 1 is a side view of a vehicle testing apparatus in accordance with the subject invention.
Figure 3:
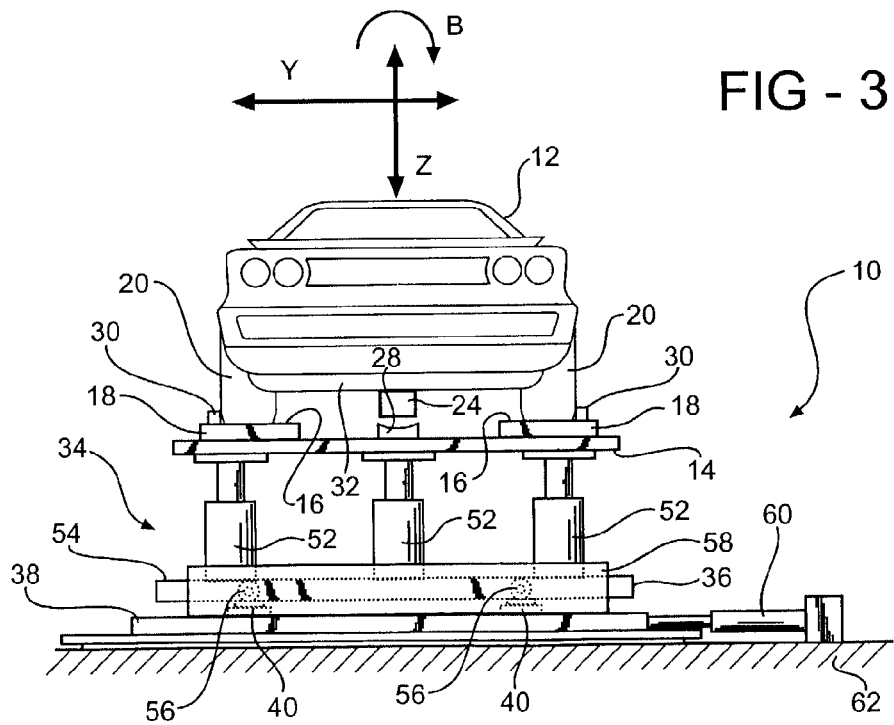
FIG. 3 is a rear view of the vehicle testing apparatus of FIG. 1.
Figure 2:
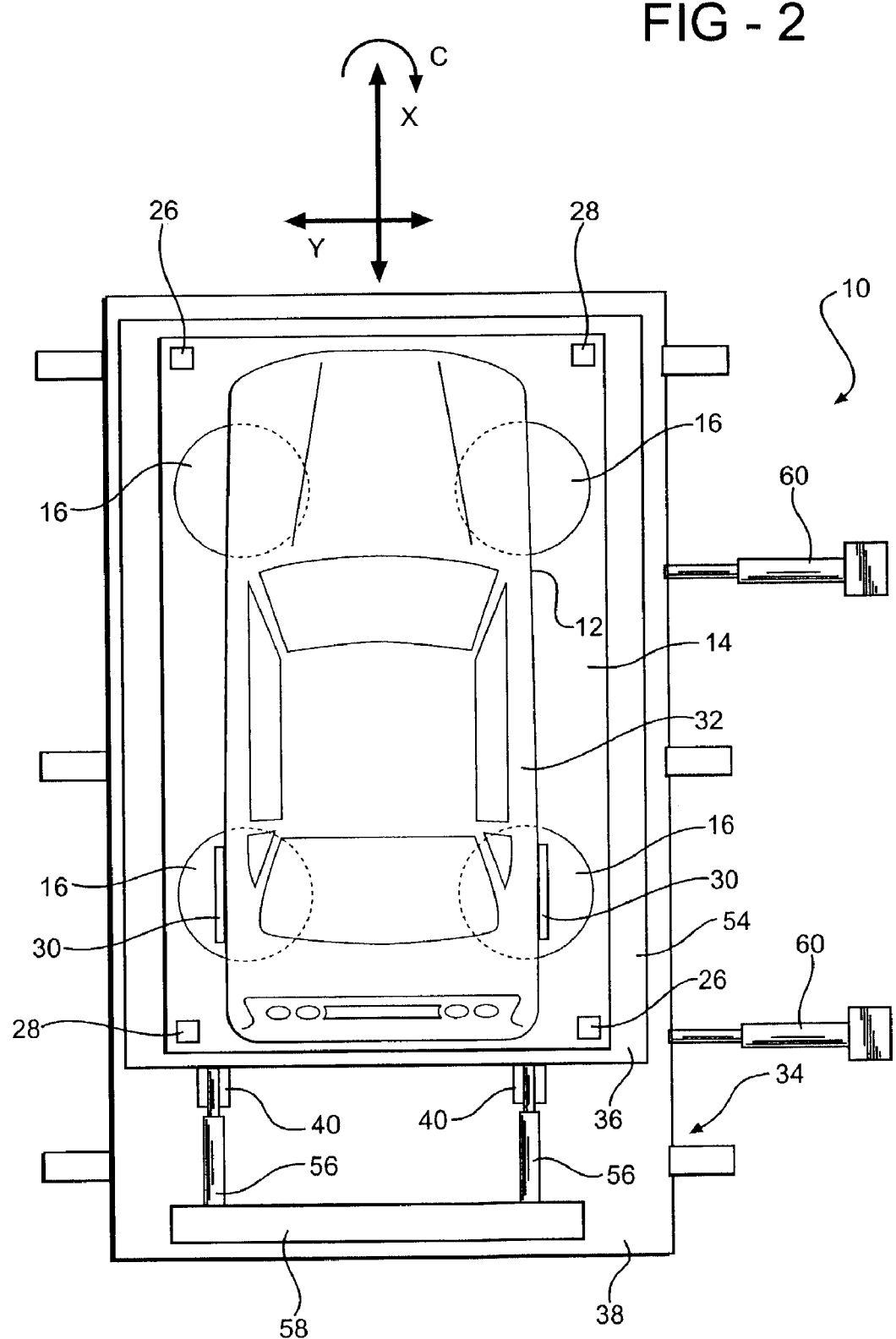
FIG. 2 is a top view of the vehicle testing apparatus of FIG. 1.

Referring to the Figures, wherein like numerals indicate like or corresponding parts throughout the several views, a vehicle testing apparatus is generally shown at 10 in FIGS. 1–3. The vehicle testing apparatus 10 is useful for subjecting a vehicle 12 to a compound force akin to a force experienced by the vehicle 12 during real-world tripped or untripped rollover situations. Thus, the vehicle testing apparatus 10 is particularly useful for testing a propensity of the vehicle 12 to rollover. It should be appreciated that any suitable type of vehicle having any number of wheels could be tested using the vehicle testing apparatus 10 of the subject invention.

Figure 14:
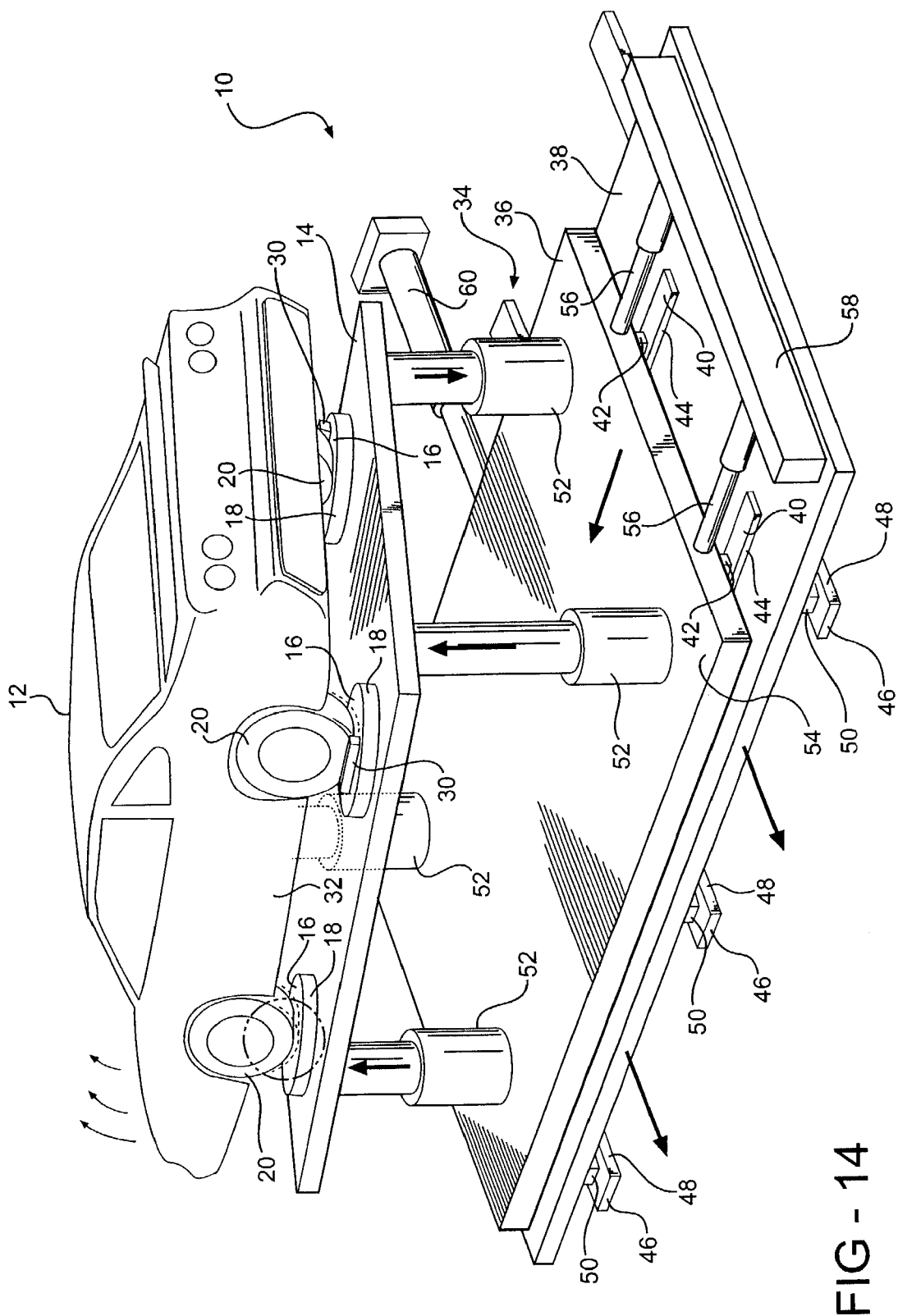
FIG. 14 is a perspective view of another embodiment of the vehicle testing apparatus during a rollover maneuver showing wheel lift-off.
Figure 15:
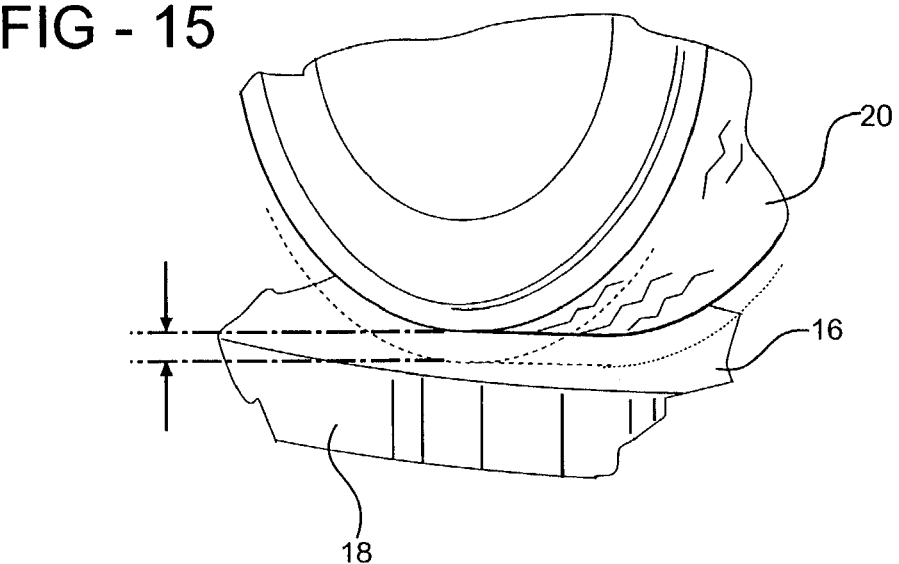
FIG. 15 is an enlarged fragmentary view of a wheel of the vehicle lifting off of the vehicle testing apparatus of FIG. 14.

The vehicle testing apparatus 10 includes a support 14 disposed in a horizontal plane for supporting the vehicle 12. The support 14 includes a number of contact surfaces 16 for receiving and supporting wheels 20 of the vehicle 12. Each of the contact surfaces 16 includes a sensor 18 for measuring a static weight of the vehicle 12 and a load applied to each wheel 20 in three axes X, Y, Z during movement of the support 14. For example, when performing a vehicle rollover maneuver, as shown in FIG. 14, each sensor 18 constantly measures a weight distribution of the vehicle 12 on the corresponding contact surface 16. As discussed in greater detail below, rollover maneuvers can either trip or not trip a vehicle. During a tripped rollover maneuver, a measurement of no weight distributed on a particular sensor 18 indicates wheel lift-off, as shown in FIG. 15, from the contact surface 16 associated with that sensor 18. When excessive lateral wheel slip is expected, such as on-road untripped rollover maneuver tests, load cells can be placed on a wheel rim along a spindle axis. When there is limited slip allowed, there are several ways of sensing wheel lift-off such as using proximity sensors to detect the clearance of the vehicle 12 to the support 14, using angular displacement sensors, etc. The sensor 18 would, by itself, not accurately detect wheel lift-off during wheel slip because the measured force on the sensor 18 during slip is zero. Hence, this configuration allows a load measurement regardless of the position of the wheels 20 on the support 14. In this configuration, the contact surfaces 16 are either not used or increased in length laterally to accommodate vehicle slip. Measuring vehicle slip is important because many vehicles slip or skid before rolling over during untripped rollover maneuvers.

Referring to FIG. 4, an alternative support design is illustrated. In particular, each contact surface 16 may be mounted on a track 15 for allowing movement in at least one of the three axes X, Y, Z. The contact surfaces 16 may be controlled by contact surface actuators 17 to replicate a specific load profile on each wheel 20 during real-world driving situations. The contact surface actuators 17 are shown moving the contact surfaces 16 along a second axis Y, but it is to be appreciated that the contact surface actuators 17 can be positioned to move the contact surfaces along any of the three axes X, Y, Z and combinations thereof. Turning to FIG. 5, another alternative support design is shown. In particular, springs 19 may be disposed between the contact surfaces 16 and the support 14. As the vehicle testing apparatus 10 moves the support 14, an inertial force $F_I$ of the vehicle 12 is in an opposite direction of the movement of the support 14. The springs 19 allow the contact surfaces 16 to move based on the inertial force $F_I$ of the vehicle 12 to replicate the load of a specific profile on each wheel 20 during real-world driving situations.

The contact surfaces 16 can also be adjustable to accommodate vehicles 12 having various track widths. Additional contact surfaces 16 can be included to accommodate vehicles 12 having more than two axles, such as semi trucks. Further, semi-truck rollovers may require multiple vehicle testing apparatuses 10 to be used in series since a trailer and a cabin have at least two separate rigid bodies and they may each require an individual apparatus of their own for dynamic rollover simulation.

Turning back to FIGS. 1–3, the vehicle 12 is equipped with a computer-controlled steering system to control a turn angle of the wheels 20 during the vehicle rollover maneuver. The computer-controlled steering system is equipped with a servo actuator and a steering wheel angle instrument to measure an angle of movement of a steering wheel 22. The contact surfaces 16 can optionally be free to rotate with minimum friction as the computer-controlled steering system rotates the wheels 20 during the vehicle rollover maneuver. A wheel angle instrument is included on the support 14 for measuring an angle of movement of the wheels 20 in response to movement of the steering wheel 22. A relationship between the steering wheel angle measurement and the wheel angle measurement is established to allow accurate control over the wheel angle by moving the steering wheel 22.

Additionally, a number of measurement devices 24, 26, 28 for measuring movement of the support 14 and the vehicle 12 are included on the support 14 and on the vehicle 12. The measurement devices 24, 26, 28 may all be mounted on the vehicle 12 or all mounted on the support 14 or both. The measurement devices 24, 26, 28 include at least one accelerometer 26 for measuring accelerations of the support 14 and the vehicle 12 in the three axes X, Y, Z. The support 14 can also experience forces in a first pivotal direction A, a second pivotal direction B, and a first rotational direction C. The measurement devices 24, 26, 28 can further include at least one transducer 28 for measuring the forces in the first pivotal direction A, the second pivotal direction B, and the first rotational direction C. The measurement devices 24, 26, 28 further include instruments 24 such as a proximity sensor to measure a height of a body 32 of the vehicle 12 from the support 14, angular rate measurement devices to measure an angular velocity of the support 14 in the first A and second B pivotal directions and the first rotational direction C, and angular displacement sensors to measure the orientation of the support 14 and vehicle 12 in the directions A, B, and C.

Figure 9:
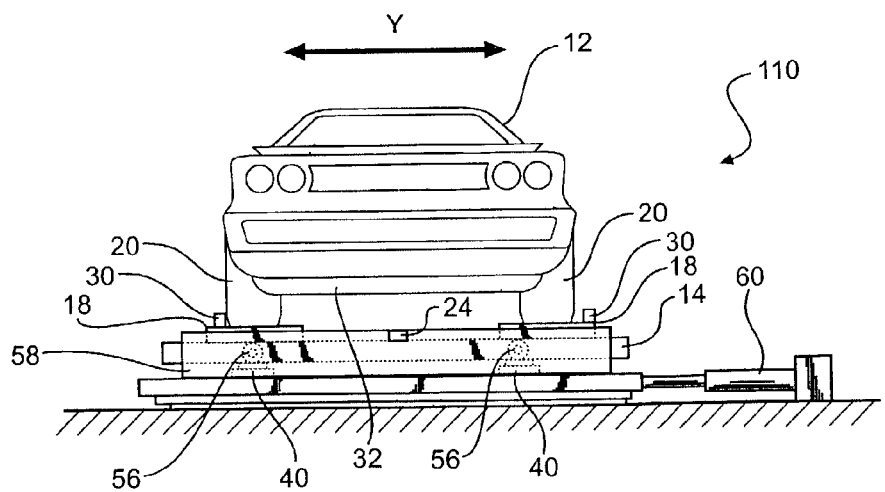
FIG. 9 is a rear view of the vehicle testing apparatus of FIG. 8.
Figure 10:
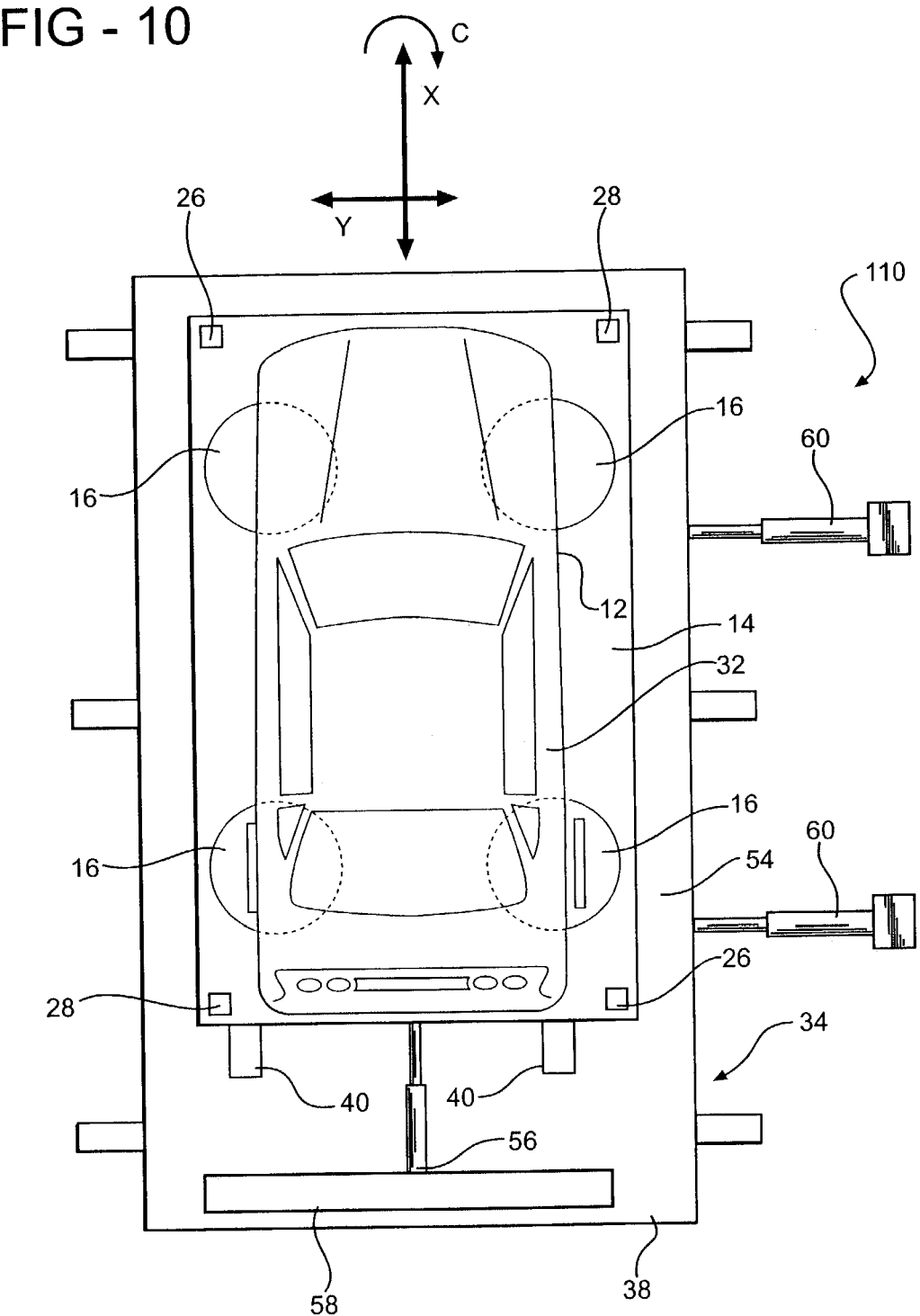
FIG. 10 is a top view of the vehicle testing apparatus of FIG. 8.

Preferably, one or more of the contact surfaces 16 include a tripping wall 30 extending vertically from the support 14 to conduct specific tripped rollover maneuvers. The tripping wall 30 prevents slippage of the wheels 20 during movement of the support 14 during tripped rollover simulations or when the maneuver requires some slip before being tripped. As shown in FIGS. 9 and 10, when some slip is required, the tripping wall 30 is positioned at a certain distance from the wheels 20. The tripping wall 30 creates a fulcrum at one or more of the wheels 20 of the vehicle 12 on the vehicle testing apparatus 10 to test the propensity of the vehicle 12 to rollover when tripped. Alternatively, the tripping wall 30 can be removed to test the propensity of the vehicle 12 to roll over without being tripped.

Figure 7:
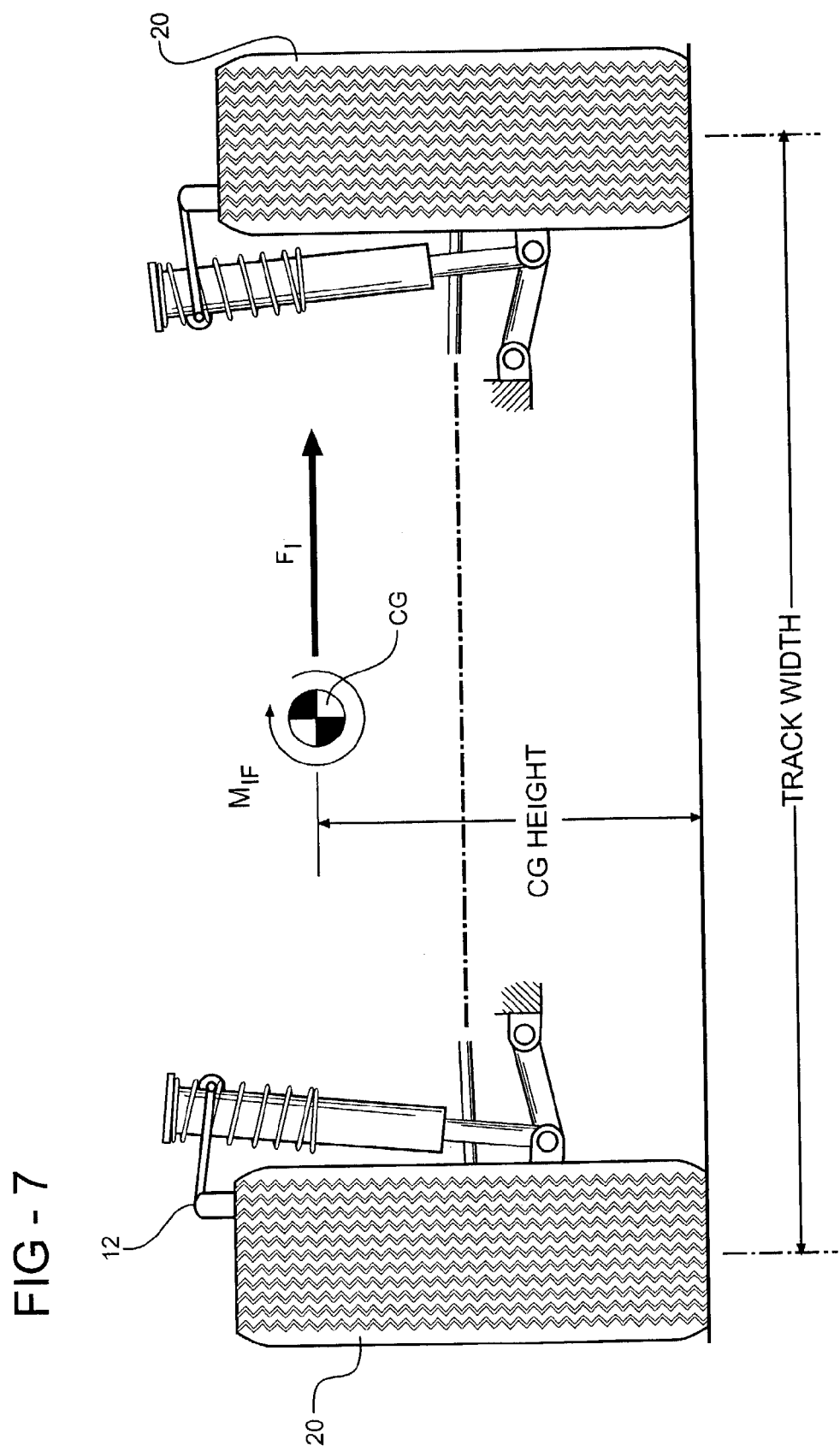
FIG. 7 is a partially fragmented planar view of a wheel base and suspension of the vehicle illustrating additional points of measurement relevant to the propensity of the vehicle to rollover.

As best shown in FIGS. 6 and 7, during movement of the support 14, the inertial force $F_I$ of the vehicle 12 is in an opposite direction of the movement of the support 14. Wheel lift-off (FIG. 15) theoretically occurs when a moment of the inertial force $M_{IF}$ about the wheel 20 overcomes a vertical force of gravity on the vehicle 12. The moment of the inertial force $M_{IF}$ is measured at a center of gravity CG of the vehicle 12 using a center of gravity height CG Height. Many other factors also dictate the point at which the wheel lift-off will occur. Referring to FIG. 6, for example, a roll center RC is an axis about which the vehicle 12 rolls and is dependent on a type of suspension of the vehicle 12. The roll center RC is not easily predicted through calculations and is generally developed through real-world testing. In addition, a distance D from the center of gravity CG to a bottom 31 of the body 32 of the vehicle 12 also has an effect on wheel lift-off, as does the wheel angle of the vehicle 12 during movement of the support 14. Many other properties of the vehicle 12 also have an effect on wheel lift-off, and thus a propensity of the vehicle to rollover.

Referring back to FIGS. 1–3, a mechanism 34 is coupled to the support 14 for moving the support 14 along and around the three axes X, Y, Z. The three axes X, Y, Z are preferably perpendicular to one another. The mechanism 34 subjects the vehicle 12 to the compound force that is the result of simultaneous movements along and around any combination of the three axes X, Y, Z. The compound force is either in a linear direction that is along one of the three axes X, Y, Z or a combination of the three axes X, Y, Z, the first pivotal direction A, the second pivotal direction B, the first rotational direction C, or a combination of the first pivotal direction A, the second pivotal direction B, and the first rotational direction C, or a combination of the linear directions, pivotal directions, and rotational direction.

The mechanism 34 includes a first member 36 constrained for rectilinear movement along a first axis X of the axes X, Y, Z. Preferably, the first member 36 is a first platform 36, but can also be a first frame or any other body capable of supporting a weight of the vehicle 12 and the support 14 while being movable along the first axis X. The measurement devices 26, 28 can also be included on the first member 36. The mechanism 34 further includes a second member 38 constrained for rectilinear movement along the second axis Y of the axes X, Y, Z. The first axis X is horizontally disposed. Like the first member 36, the second member 38 is preferably a second platform 38, but can also be a second frame or any other body capable of supporting a weight of the vehicle 12, the support 14, and the first member 36 while being movable along the second axis Y. The second axis Y, like the first axis X, is horizontally disposed perpendicular to the first axis X. A third axis Z is a vertical axis.

Figure 16:
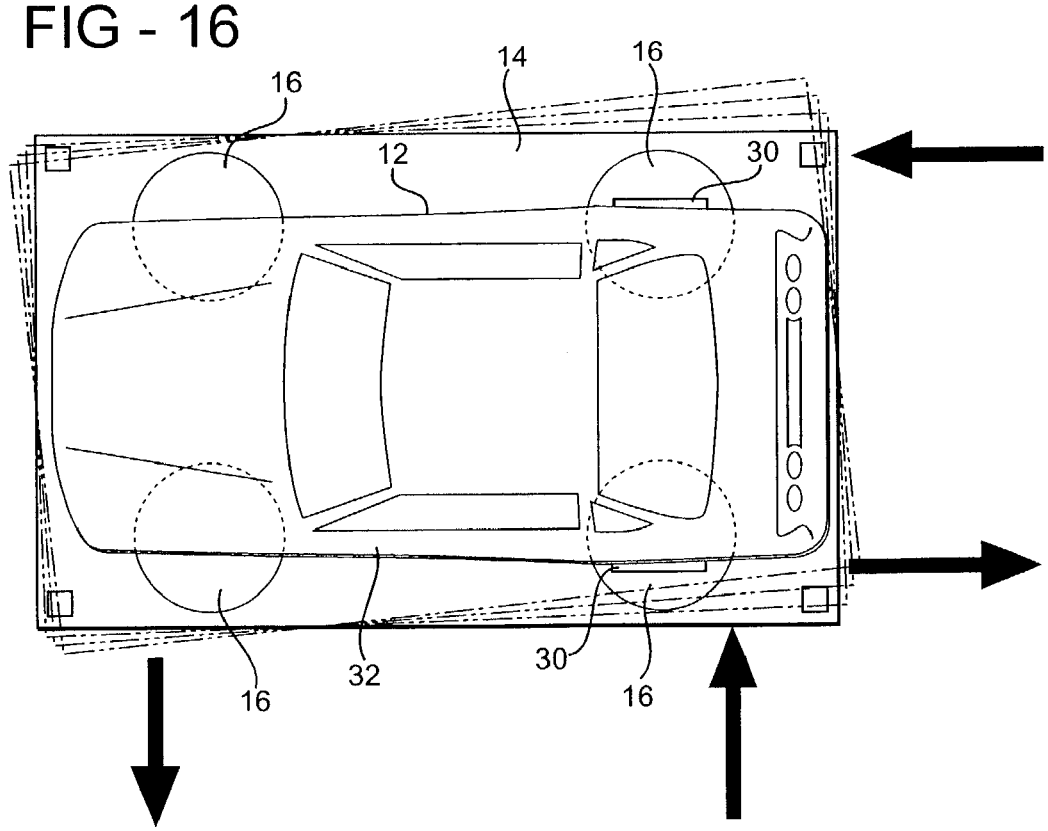
FIG. 16 is a top view of the vehicle testing apparatus of FIG. 1 with the support being rotatable about a first rotational axis.

As best shown in FIGS. 1–3 and 14, a first track 40 is disposed between the first member 36 and the second member 38 for providing the rectilinear movement of the first member 36 along the first axis X. The first track 40 includes at least one first rail 42 with a corresponding first slot 44. The first rail 42 is mounted to the first member 36. The first slot 44 receives the first rail 42. Preferably, the first track 40 includes additional first rails 42 with corresponding first slots 44 for providing the rectilinear movement of the first member 36 along the first axis X. As shown in FIG. 14, the first rails 42 are fixed to the first member 36 to prevent the first member 36 from rotating in the first rotational direction C. The first rails 42 may also be pivotally mounted to the first member 36 to allow the first member 36, and thus the support 14, to rotate in the first rotational direction C, as shown in FIG. 16.

A second track 46 supports the second member 38 for providing the rectilinear movement of the second member 38 along the second axis Y. Preferably, the second track 46 includes at least one second rail 48 and a corresponding second slot 50. The second rail 48 is mounted to the second member 38. The second slot 50 receives the second rail 48. Preferably, the second track 46 includes additional second rails 48 with corresponding second slots 50 for providing the rectilinear movement of the second member 38 along the second axis Y. As shown in FIG. 14, the second rails 48 are fixed to the second member 38 to prevent the second member 38 from rotating in the first rotational direction C. The second rails 48 may also be pivotally mounted to the second member 38 to allow the second member 38, and thus the first member 36 and the support 14, to rotate in the first rotational direction C, as shown in FIG. 16.

The mechanism 34 further includes at least one vertical actuator 52. The vertical actuator 52 is preferably a servo-hydraulic actuator or any piston-type actuator capable of supporting and moving the support 14 and the vehicle 12 installed on the vehicle testing apparatus 10. It should be appreciated that the actuator 52 can be of any suitable design including electrical. The first member 36 includes a top surface 54 to which the vertical actuator 52 is mounted. The vertical actuator 52 extends vertically between the first member 36 and the support 14 for moving the support 14 along the third axis Z relative to the first member 36. Preferably, the mechanism 34 includes at least two vertical actuators 52. The vertical actuators 52 are independently movable for moving the support 14 in at least one of the first pivotal direction A and the second pivotal direction B relative to the first member 36, in addition to moving the support 14 along the third axis Z relative to the first member 36. More preferably, as shown in FIG. 14, the mechanism 34 includes at least four vertical actuators 52. The vertical actuators 52 are independently movable for moving the support 14 along the third axis Z relative to the first member 36 and for moving the support 14 in the first pivotal direction A, the second pivotal direction B, or a combination of the first A and second B pivotal directions relative to the first member 36. As shown in FIG. 3, additional vertical actuators 52 can be included to provide additional support 14 depending on a type of vehicle 12 being tested on the vehicle testing apparatus 10. For example, a semi truck presents a heavier load than a normal passenger vehicle 12. Thus, the vehicle testing apparatus 10 having the semi truck may require additional vertical actuators 52 to support the heavier load.

The mechanism 34 further includes a first actuating device 56 for moving the first member 36 along the first axis X. The first actuating device 56 is any type of push/pull mechanism capable of moving the first member 36 along the first axis X. Preferably, the first actuating device 56 is a servo-hydraulic actuator. The first actuating device 56 reacts between the first member 36 and the second member 38 for moving the first member 36 relative to the second member 38 along the first axis X.

The second member 38 preferably includes a wall 58 extending upwardly therefrom. The first actuating device 56 is mounted between the wall 58 and the first member 36. The first actuating device 56 includes at least one longitudinal actuator 56 for moving the first member 36 along the first axis X. Preferably, the first actuating device 56 includes at least two longitudinal actuators 56 for moving the first member 36 along the first axis X and for moving the first member 36 in the first rotational direction C with respect to the second member 38, if desired. Preferably, the two longitudinal actuators 56 are independently movable for moving the first member 36 in the first rotational direction C relative to the second member 38, as shown in FIG. 16.

The mechanism 34 also includes a second actuating device 60 for moving the second member 38 along the second axis Y. The second actuating device 60 is any type of push/pull mechanism capable of moving the second member 38 along the second axis Y. Preferably, the second actuating device 60 is a servo-hydraulic actuator. The second actuating device 60 includes at least one lateral actuator 60 for moving the second member 38 along the second axis Y. Preferably, as shown in FIG. 2, the second actuating device 60 includes two lateral actuators 60 for moving the second member 38 along the second axis Y and in a first rotational direction C relative to a foundation 62, if desired.

Figure 8:
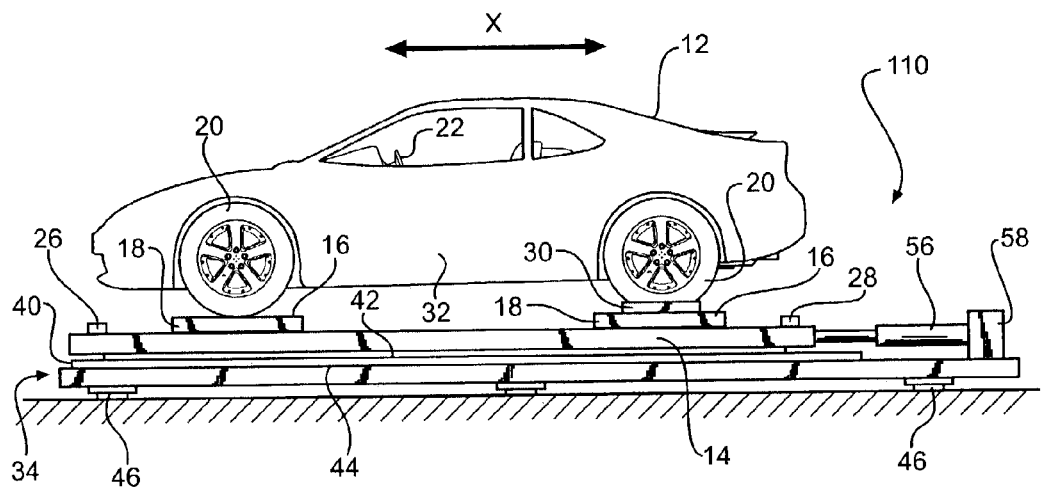
FIG. 8 is a side view of an alternative embodiment of the vehicle testing apparatus.

Referring to FIGS. 8–10, an alternative embodiment of the vehicle testing apparatus 110 includes the mechanism 34 coupled to the support 14. The first member 36 and the vertical actuators 52 are not included in this embodiment of the vehicle testing apparatus 110. The first actuating device 56 reacts between the second member 38 and the support 14 for moving the support 14 along the first axis X. As illustrated, the first actuating device 56 includes only a single longitudinal actuator 56. It should be appreciated that any suitable number of longitudinal actuators could be used in either of the embodiments. The second actuating device 60, as illustrated, includes two lateral actuators 60 for moving the second member 38 along the second axis Y and for rotating the second member 38 about the first rotational direction C. It has been found that additional power is required to move the vehicle testing apparatus 10, 110 in the lateral direction (Y axis). However, it should be appreciated that any suitable number of lateral actuators could be used in either of the embodiments. Although not required, the contact surface actuators 17, as shown in FIG. 4, can be included to control the contact surfaces 16. The contact surface actuators 17 can be positioned in any desired direction to move and control the forces on the contact surfaces 16 along multiple axes according to a set criteria. As also illustrated, one of the tripping walls 30 is positioned a certain distance from the wheel 20.

The first rails 46 are mounted to the support 14 instead of to the first member 36. The first rails 46 and the second rails 48 are fixed to the support 14 and the second member 38, respectively, to prevent the second member 38 from rotating in the first rotational direction C. The first rails 46 and/or second rails 48 may be pivotally mounted to the support 14 and/or second member 38, respectively, to allow the support and/or the second member 38 to rotate in the first rotational direction C, as shown in FIG. 16. The remaining features previously and subsequently discussed are essentially identical between the preferred embodiment of FIGS. 1–3 and the alternative embodiment of FIGS. 8–10. It should be appreciated that the vehicle testing apparatus 10, 110 may be of any suitable design or configuration so long as the apparatus is capable of exciting the vehicle 12 in six degrees of freedom and optionally able to control tire reaction forces.

Figure 11A:
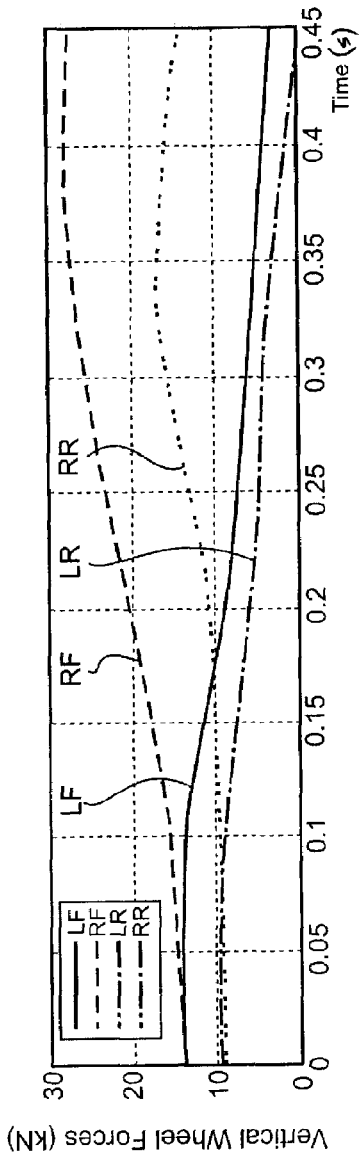
FIG. 11A is a graphical illustration of vertical wheel forces with respect to time for a J-turn vehicle rollover maneuver with braking of the vehicle at 75 kilometers per hour using the vehicle testing apparatus of FIG. 1.
Figure 11B:
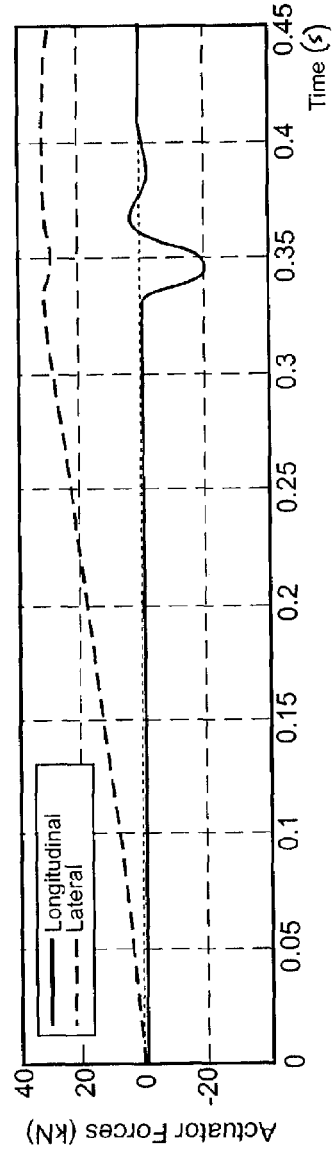
FIG. 11B is a graphical illustration of actuator forces with respect to time for the J-turn vehicle rollover maneuver with braking of the vehicle at 75 kilometers per hour using the vehicle testing apparatus of FIG. 1.
Figure 11C:
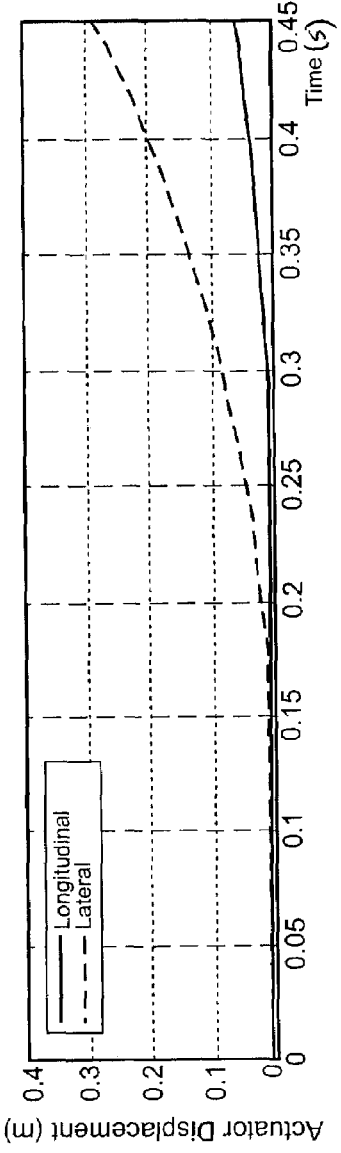
FIG. 11C is a graphical illustration of actuator displacement with respect to time for the J-turn vehicle rollover maneuver with braking of the vehicle at 75 kilometers per hour using the vehicle testing apparatus of FIG. 1.
Figure 12A:
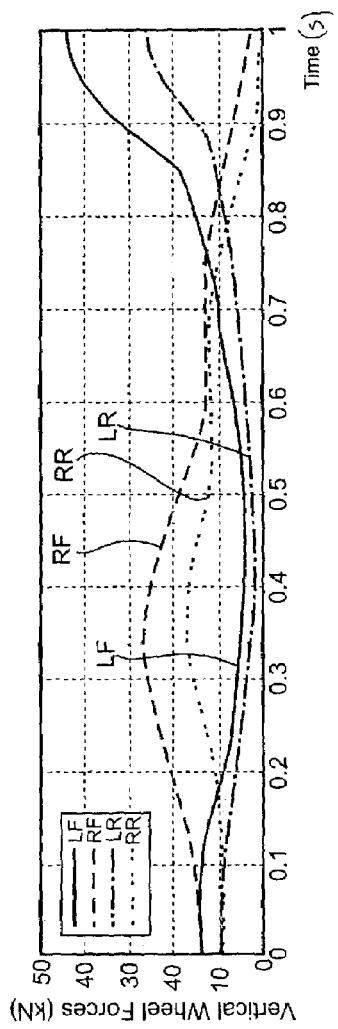
FIG. 12A is a graphical illustration of vertical wheel forces with respect to time for a fish hook vehicle rollover maneuver with braking of the vehicle at 75 kilometers per hour using the vehicle testing apparatus of FIG. 1.
Figure 12B:
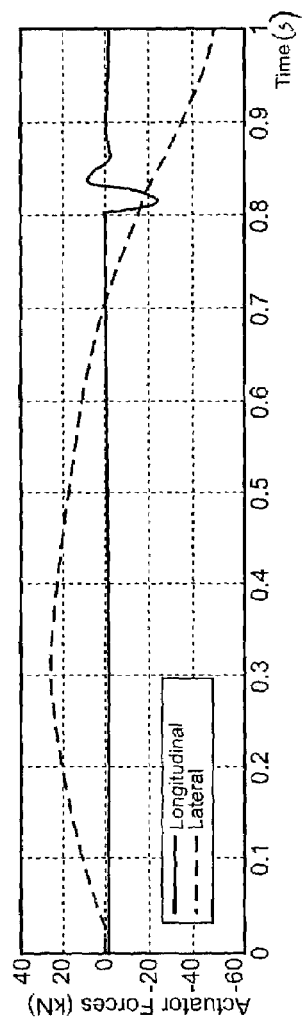
FIG. 12B is a graphical illustration of actuator forces with respect to time for the fish hook vehicle rollover maneuver with braking of the vehicle at 75 kilometers per hour using the vehicle testing apparatus of FIG. 1.
Figure 12C:
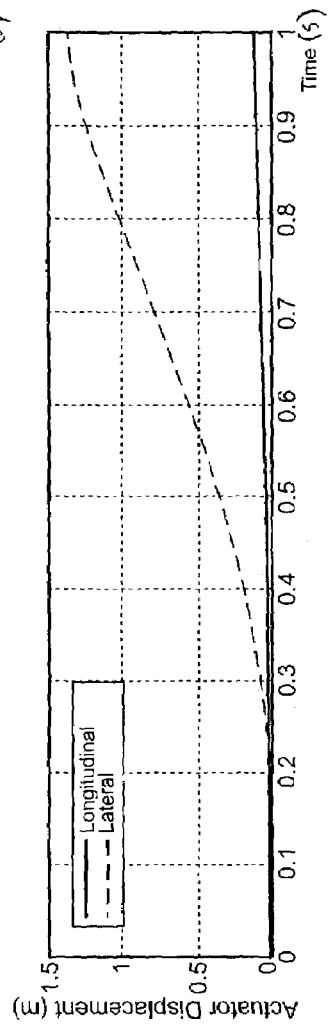
FIG. 12C is a graphical illustration of actuator displacement with respect to time for the fish hook vehicle rollover maneuver with braking of the vehicle at 75 kilometers per hour using the vehicle testing apparatus of FIG. 1.
Figure 13A:
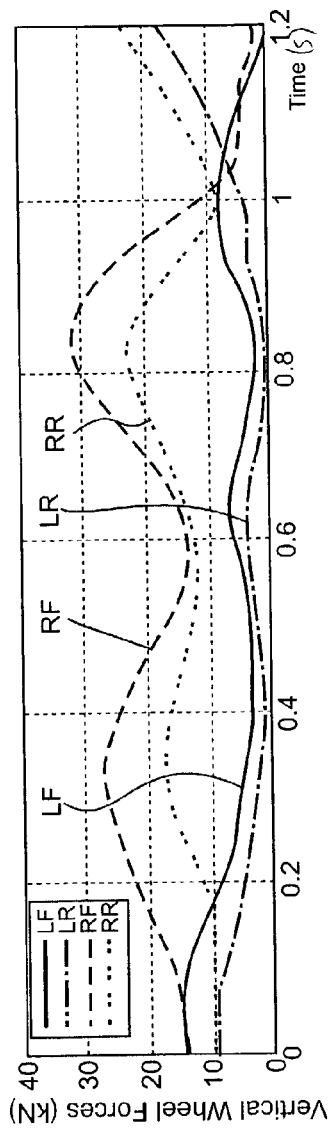
FIG. 13A is a graphical illustration of vertical wheel forces with respect to time for a resonant steer vehicle rollover maneuver of the vehicle at 120 kilometers per hour using the vehicle testing apparatus of FIG. 1.
Figure 13B:
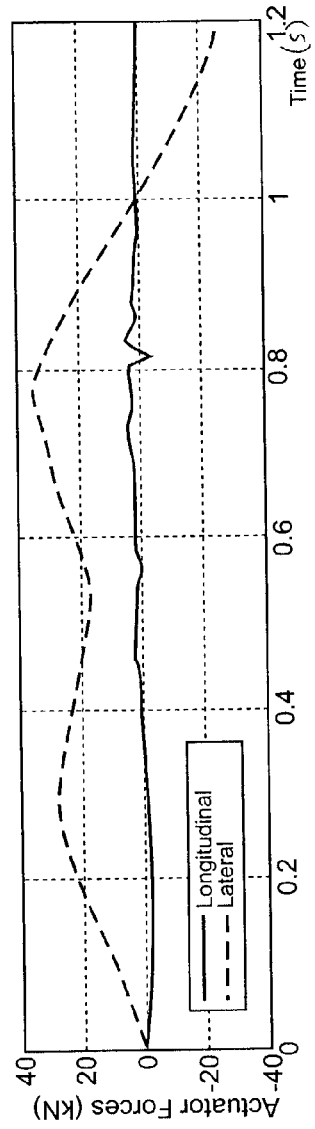
FIG. 13B is a graphical illustration of actuator forces with respect to time for the resonant steer vehicle rollover maneuver of the vehicle at 120 kilometers per hour using the vehicle testing apparatus of FIG. 1.
Figure 13C:
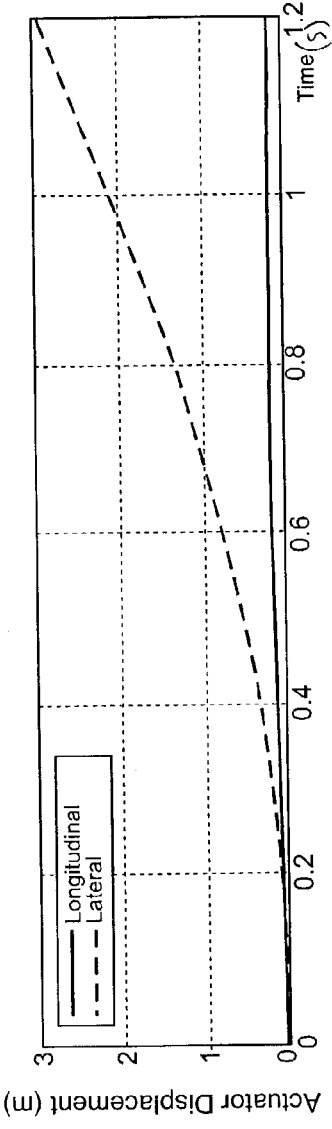
FIG. 13C is a graphical illustration of actuator displacement with respect to time for the resonant steer vehicle rollover maneuver of the vehicle at 120 kilometers per hour using the vehicle testing apparatus of FIG. 1.

The vehicle testing apparatuses 10, 110 further include a controller for sending control signals to the mechanism 34 for moving the support 14. The controller regulates movement of the vertical actuators 52, the first actuating device 56, and the second actuating device 60 to produce a desired motion of the support 14. The controller can also send control signals to the computer controlled steering system. Referring to FIGS. 11 through 13, the controller can send signals to the vertical actuators 52, the first actuating device 56, and the second actuating device 60, as well as the computer controlled steering system, to create an actuator displacement over a period of time. The controller moves the vertical actuators 52, the first actuating device 56, the second actuating device 60, and the computer controlled steering system depending on the vehicle rollover maneuver or vehicle characterization test to be performed. For example, FIG. 11C shows a graphical illustration of actuator displacement with respect to time for a J-turn vehicle rollover maneuver with braking of the vehicle 12 at 75 kilometers per hour. FIG. 11B is a graphical illustration of actuator forces required to create the actuator displacement with respect to time for the vertical actuators 52, the first actuating device 56, and the second actuating device 60. FIG. 11A is a graphical illustration of vertical wheel forces with respect to time. Thus, at any given time in FIGS. 11A through 11C, actuator displacement, actuator forces, and vertical wheel forces are shown. A point of wheel lift-off is indicated in FIG. 11A when the vertical wheel forces is zero. Many other vehicle rollover maneuvers can be tested with the vehicle testing apparatus 10, 110. For example, FIGS. 12A through 12C and 13A through 13C show similar graphical illustrations of actuator displacement, actuator forces, and vertical wheel forces as FIGS. 11A through 11C but for a fish hook vehicle rollover maneuver with braking of the vehicle 12 at 75 kilometers per hour and for a resonant steer vehicle rollover maneuver of the vehicle 12 at 120 kilometers per hour, respectively. These types of maneuvers are well known in the art and as such will not be discussed in any greater detail.

Referring to FIG. 14, an example of a typical rollover maneuver is now discussed in detail. The vehicle testing apparatus 10, 110 is calibrated to make sure that the controller and measurement devices 24, 26, 28 are functional. The vehicle 12 is installed on the support 14, which requires that the track width and wheelbase of the vehicle be measured and the contact surfaces 16 adjusted accordingly such that each wheel 20 will align with one of the contact surface 16. The vehicle 12 is inspected and parameters such as tire pressure, fuel level, number of dummies used for driver and passengers, the payload used in a trunk, etc are all recorded.

The vehicle's overall steering ratio is now established. In particular, the relationship between the steering wheel angle measurement and the wheel angle measurement is then established. The static weight of the vehicle is measured by bringing the support 14 into a horizontal position with the vertical actuators 52. Based on the static weight as measured at each contact surface 16, the center of gravity CG is determined. The support 14 is then brought to a slight angle to determine the height of the center of gravity CG height. Other static tests can also be performed before testing.

The vehicle 12 is subjected to a number of preliminary tests to determine various static and dynamic properties of the vehicle 12. The preliminary tests include operating the vehicle testing apparatus 10, 110 to establish a moment and product of inertia matrix, a static stability factor (SSF), a tilt table ratio (TTR), a roll natural frequency, a pitch natural frequency, a heave natural frequency, a roll angle to lateral acceleration gain, a roll safety factor, a dynamic stability factor, a pitch angle to longitudinal deceleration gain, a pitch safety factor, a critical sliding velocity, a lateral acceleration versus steering frequency, and a steady state rollover threshold of the vehicle 12. As appreciated, any suitable test may be performed in any desired order.

The results of the preliminary tests and other measurements are preferably fed into a computer simulator program. A user commands the computer simulator program to simulate a vehicle rollover maneuver. The vehicle rollover maneuver can be a J turn, a J turn with braking, a fish hook, a fish hook with braking, a resonant steer maneuver, a double lane change, a split-mu situation, or any desired tripped or untripped rollover maneuver. Parameters associated with the vehicle rollover maneuvers, such as vehicle speed, steering wheel variation, brake application profile, etc can be adjusted. The computer simulator program produces the simulated vehicle rollover maneuver, which includes forces and moments that the vehicle 12 experiences during the simulated vehicle rollover maneuver. It should be appreciated that the forces and moments could alternatively be determined from other computer related programs or even from manual tables, charts, and the like.

The forces and moments are fed into a calculation algorithm that is unique to a geometry and instrumentation of the vehicle testing apparatus 10, 110. The calculation algorithm converts the forces and moments into actuator signals for at least the first actuating device 56 and the second actuating device 60, as well as the vertical actuators 52, if desired. The actuator signals are provided to a real time controller, which generates drive signals for the actuators 52, first actuating device 56, and/or second actuating device 60.

The vertical actuators 52, the first actuating device 56, and/or the second actuating device 60 then actuate the support 14 for performing the vehicle rollover maneuver. In particular, the vertical actuators 52, the first actuating device 56, and/or the second actuating device 60 move the support 14, the first member 36, and/or the second member 38, respectively, thereby moving the vehicle 12.

The measurement devices 24, 26, 28, along with the sensors 18 on each contact surface 16, provide measurements of an actual vehicle response to the movement of the support 14, the first member 36, and the second member 38. The measurements are fed back into the real time controller to close a feedback control loop. If a wheel lift-off does not occur, then the real time controller alters the actuator signals as necessary and provides updated signals to the vertical actuators 52, the first actuating device 56, and/or the second actuating device 60. The feedback control loop preferably continues until double wheel liftoff occurs signaling a vehicle rollover. Thus, exact forces and moments to cause the vehicle rollover maneuver are produced and recorded to establish a new standard for measuring the propensity of the vehicle 12 to rollover.

Other specifics of the method of replicating a real-world vehicle rollover through a series of steps are disclosed and claimed in co-pending U.S. application Ser. No. 10/428,595, filed May 2, 2003, entitled Method of Measuring a Propensity of a Vehicle to Roll Over,the disclosure of which is hereby incorporated by reference.

In principle, the vehicle testing apparatuses 10, 110 represent a device that excites a vehicle 12 to allow the measurement of threshold values that represent the vehicle's rollover propensity in multiple axes, while controlling forces of the chassis and the wheel reaction forces along with the steering position.

Obviously, many modifications and variations of the present invention are possible in light of the above teachings. The invention may be practiced otherwise than as specifically described within the scope of the appended claims wherein reference numerals in the claims are merely for convenience and are not to be read in any way as limiting

What is claimed is:

1. A vehicle testing apparatus for subjecting a vehicle having wheels to a compound force, said apparatus comprising:
 a support disposed in a horizontal plane for supporting the vehicle at spaced positions on the vehicle wheels;
 a mechanism coupled to said support for moving said support along three axes perpendicular to one another for subjecting the vehicle to the compound force that is a result of simultaneous movements along any combination of said axes;
 said mechanism comprising a first member constrained for rectilinear movement along a first axis of said axes and a second member constrained for rectilinear movement along a second axis of said axes, at least one of said first and second members being mounted on the other of said members, said support mounted on said one member, whereby said mechanism creates a compound force resulting from simultaneous movement along a combination of said axes.

2. A vehicle testing apparatus as set forth in claim 1 wherein said first axis and said second axis are both horizontally disposed with a third axis being a vertical axis.

3. A vehicle testing apparatus as set forth in claim 2 wherein said mechanism further includes a first track disposed between said first member and said second member for providing said rectilinear movement of said first member along said first axis.

4. A vehicle testing apparatus as set forth in claim 3 wherein said mechanism further includes a second track supporting said second member for providing said rectilinear movement of said second member along said second axis.

5. A vehicle testing apparatus as set forth in claim 1 wherein said mechanism includes a first actuating device for moving said first member along said first axis.

6. A vehicle testing apparatus as set forth in claim 5 wherein said first actuating device reacts between said first member and said second member for moving said first member relative to said second member along said first axis.

7. A vehicle testing apparatus as set forth in claim 5 wherein said first actuating device includes at least one longitudinal actuator for moving said first member along said first axis.

8. A vehicle testing apparatus as set forth in claim 5 wherein said mechanism includes a second actuating device for moving said second member along said second axis.

9. A vehicle testing apparatus as set forth in claim 1 further including a plurality of measurement devices for measuring movement of said support.

10. A vehicle testing apparatus for subjecting a vehicle to a compound force, said apparatus comprising:
a support disposed in a horizontal plane for supporting the vehicle;
a mechanism coupled to said support for moving said support along three axes perpendicular to one another for subjecting the vehicle to the compound force that is a result of simultaneous movements along any combination of said axes, said first axis and said second axis both being horizontally disposed with a third axis being a vertical axis;
said mechanism comprising a first member constrained for rectilinear movement along a first axis of said axes and a second member constrained for rectilinear movement along a second axis of said axes, said first member being mounted on said second member, said mechanism including at least one vertical actuator extending vertically between said first member and said support for moving said support along said third axis relative to said first member.

11. A vehicle testing apparatus as set forth in claim 10 wherein said at least one vertical actuator is at least two vertical actuators for moving said support along said third axis relative to said first member and for moving said support in at least one of a first pivotal direction and a second pivotal direction relative to said first member.

12. A vehicle testing apparatus for subjecting a vehicle to a compound force, said apparatus comprising:
a support disposed in a horizontal plane for supporting the vehicle:
a mechanism coupled to said support for moving said support along three axes perpendicular to one another for subjecting the vehicle to the compound force that is a result of simultaneous movements along any combination of said axes, said first axis and said second axis both being horizontally disposed with a third axis being a vertical axis;
said mechanism comprising a first member constrained for rectilinear movement along a first axis of said axes and a second member constrained for rectilinear movement along a second axis of said axes, said mechanism including at least one vertical actuator extending vertically between said first member and said support for moving said support along said third axis relative to said first member; said at least one vertical actuator being further defined as at least four vertical actuators for moving said support along said third axis relative to said first member and for moving said support in a first and a second pivotal direction relative to said first member.

13. A vehicle testing apparatus for subjecting a vehicle to a compound force, said apparatus comprising:
a support disposed in a horizontal plane for supporting the vehicle:
a mechanism coupled to said support for moving said support along three axes perpendicular to one another for subjecting the vehicle to the compound force that is a result of simultaneous movements along any combination of said axes, said first axis and said second axis both being horizontally disposed with a third axis being a vertical axis;
said mechanism comprising a first member constrained for rectilinear movement along a first axis of said axes and a second member constrained for rectilinear movement along a second axis of said axes, said mechanism including at least one vertical actuator extending vertically between said first member and said support for moving said support along said third axis relative to said first member; said first member being further defined as a first platform having a top surface with said at least one vertical actuator mounted to said top surface of said first platform.

14. A vehicle testing apparatus for subjecting a vehicle to a compound force, said apparatus comprising:
a support disposed in a horizontal plane for supporting the vehicle;
a mechanism coupled to said support for moving said support along three axes perpendicular to one another for subjecting the vehicle to the compound force that is a result of simultaneous movements along any combination of said axes;
said mechanism comprising a first member constrained for rectilinear movement along a first axis of said axes and a second member constrained for rectilinear movement along a second axis of said axes;
said mechanism including a first actuating device for moving said first member along said first axis, and a second actuating device for moving said second member along said second axis, said second actuating device including at least two lateral actuators for moving said second member along said second axis and for moving said second member in a first rotational direction.

15. A vehicle testing apparatus for subjecting a vehicle to a compound force, said apparatus comprising:
a support disposed in a horizontal plane for supporting the vehicle;
a mechanism coupled to said support for moving said support along three axes perpendicular to one another for subjecting the vehicle to the compound force that is a result of simultaneous movements along any combination of said axes;
said mechanism comprising a first member constrained for rectilinear movement along a first axis of said axes and a second member constrained for rectilinear movement along a second axis of said axes;

said mechanism including a first actuating device for moving said first member along said first axis, and a second actuating device for moving said second member along said second axis, said first member and said second member being further defined as a first platform and a second platform, respectively, with said first actuating device coupled to said first platform and said second actuating device coupled to said second platform.

16. A vehicle testing apparatus as set forth in claim 15 wherein said first actuating device is coupled between said first platform and said second platform.

17. A vehicle testing apparatus for subjecting a vehicle to a compound force, said apparatus comprising:
   a support disposed in a horizontal plane for supporting the vehicle;
   a mechanism coupled to said support for moving said support along three axes perpendicular to one another for subjecting the vehicle to the compound force that is a result of simultaneous movements along any combination of said axes;
   said mechanism comprising a first member constrained for rectilinear movement along a first axis of said axes and a second member constrained for rectilinear movement along a second axis of said axes, at least one of said first and second members being mounted on the other of said members, said support mounted on said one member;
   said support including a plurality of contact surfaces for receiving wheels of the vehicle.

18. A vehicle testing apparatus as set forth in claim 17 wherein each of said contact surfaces includes a sensor for measuring a weight of the vehicle and a weight distribution of the vehicle during movement of said support.

19. A vehicle testing apparatus as set forth in claim 17 wherein at least one of said plurality of contact surfaces includes a tripping wall extending vertically from said support for engaging a wheel during movement of said support.

20. A vehicle testing apparatus for subjecting a vehicle to a compound force, said apparatus comprising:
   a support disposed in a horizontal plane for supporting the vehicle;
   a mechanism coupled to said support for moving said support along three axes perpendicular to one another for subjecting the vehicle to the compound force that is a result of simultaneous movements along any combination of said axes;
   said mechanism comprising a first member constrained for rectilinear movement along a first axis of said axes and a second member constrained for rectilinear movement along a second axis of said axes;
   said mechanism including a first actuating device for moving said first member along said first axis, said first actuating device reacting between said first member and said second member for moving said first member relative to said second member along said first axis, said second member including a wall extending upwardly therefrom with said first actuating device mounted between said wall and said first member.

21. A vehicle testing apparatus for subjecting a vehicle having wheels to a compound force, said apparatus comprising:
   a support disposed in a horizontal plane for supporting the vehicle at spaced positions on the vehicle wheels;
   a mechanism coupled to said support for moving said support along three axes perpendicular to one another for subjecting the vehicle to the compound force that is a result of simultaneous movements along any combination of said axes;
   said mechanism comprising a first member constrained for rectilinear movement along a first axis of said axes and a second member constrained for rectilinear movement along a second axis of said axes whereby said mechanism creates a compound force resulting from simultaneous movement along a combination of said axes; and
   a plurality of measurement devices for measuring movement of said support, at least one of said measurement devices being selected from the group consisting of an accelerometer, a transducer, a proximity sensor, an angular rate measurement device, and an angular displacement sensor.

22. A vehicle testing apparatus for subjecting a vehicle having wheels to a compound force, said apparatus comprising:
   a support disposed in a horizontal plane for supporting the vehicle at spaced positions on the vehicle wheels;
   a mechanism coupled to said support for moving said support along three axes perpendicular to one another for subjecting the vehicle to the compound force that is a result of simultaneous movements along any combination of said axes;
   said mechanism comprising a first member constrained for rectilinear movement along a first axis of said axes and a second member constrained for rectilinear movement along a second axis of said axes whereby said mechanism creates a compound force resulting from simultaneous movement along a combination of said axes; and
   at least one accelerometer for measuring acceleration of said support and any vehicle thereon when said support is moved along said axes.

* * * * *

UNITED STATES PATENT AND TRADEMARK OFFICE
CERTIFICATE OF CORRECTION

| | | |
|---|---|---|
| PATENT NO. | : 7,058,488 B2 | Page 1 of 1 |
| APPLICATION NO. | : 10/428293 | |
| DATED | : June 6, 2006 | |
| INVENTOR(S) | : Kevin Kemp, Hamid Alper Oral and Mark Hoenke | |

It is certified that error appears in the above-identified patent and that said Letters Patent is hereby corrected as shown below:

Column 11:
Line 60, Claim 12, ":" should be --;--.

Column 12:
Line 17, Claim 13, ":" should be --;--.

Signed and Sealed this

Sixth Day of February, 2007

JON W. DUDAS
*Director of the United States Patent and Trademark Office*